J. P. SEXTON.
MACHINE FOR MAKING AND CUTTING PLASTER BOARD.
APPLICATION FILED SEPT. 26, 1918.
1,288,703.
Patented Dec. 24, 1918.
3 SHEETS—SHEET 2.
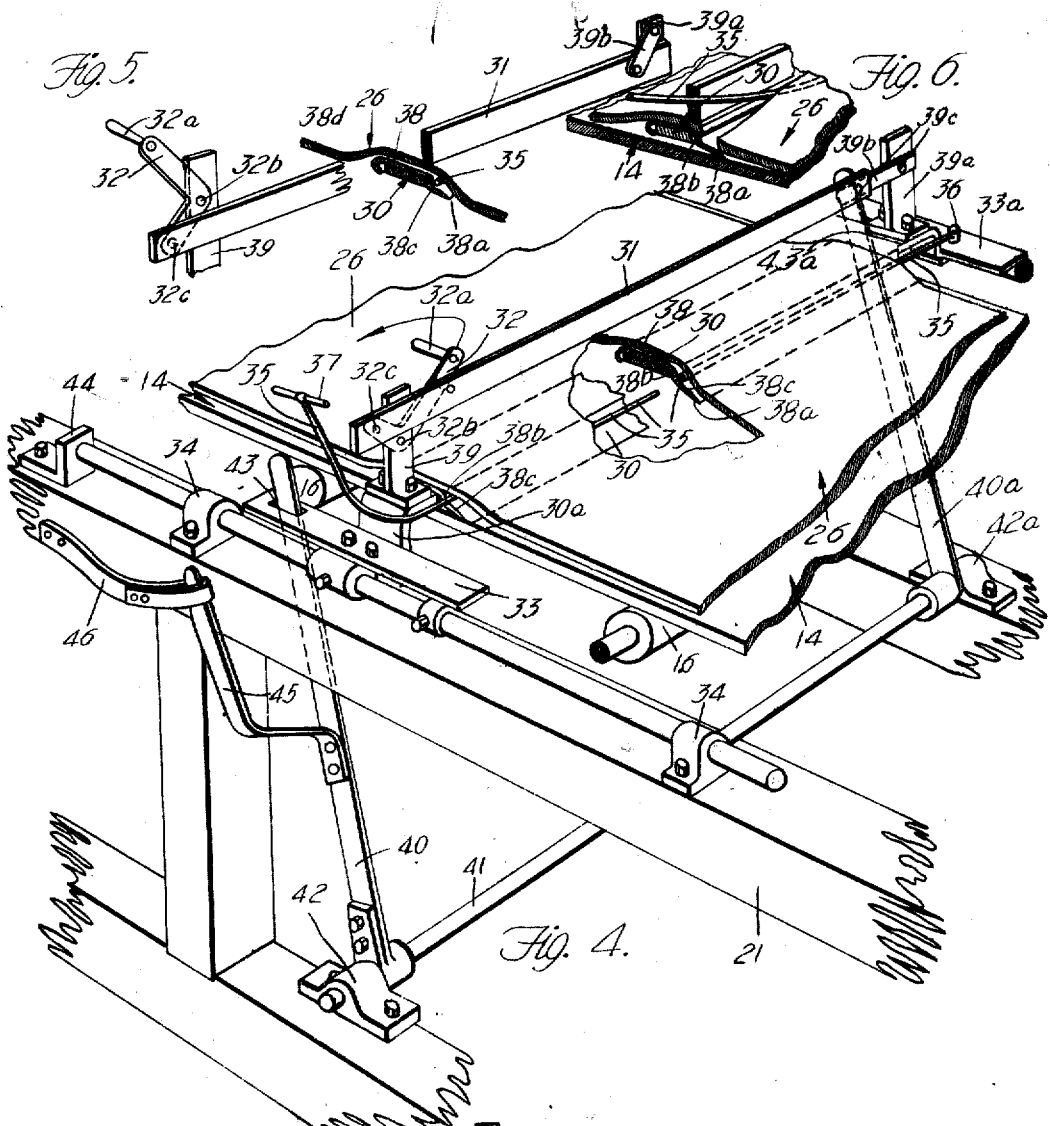
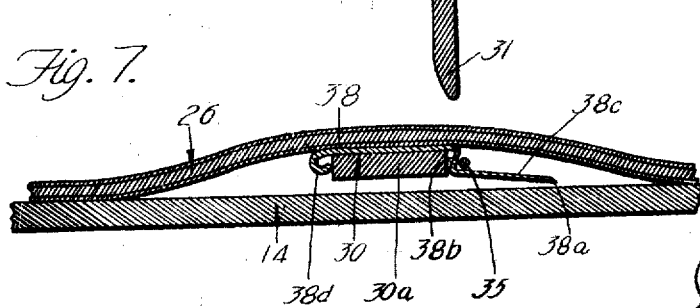
Inventor
James P. Sexton
by
his Attorney

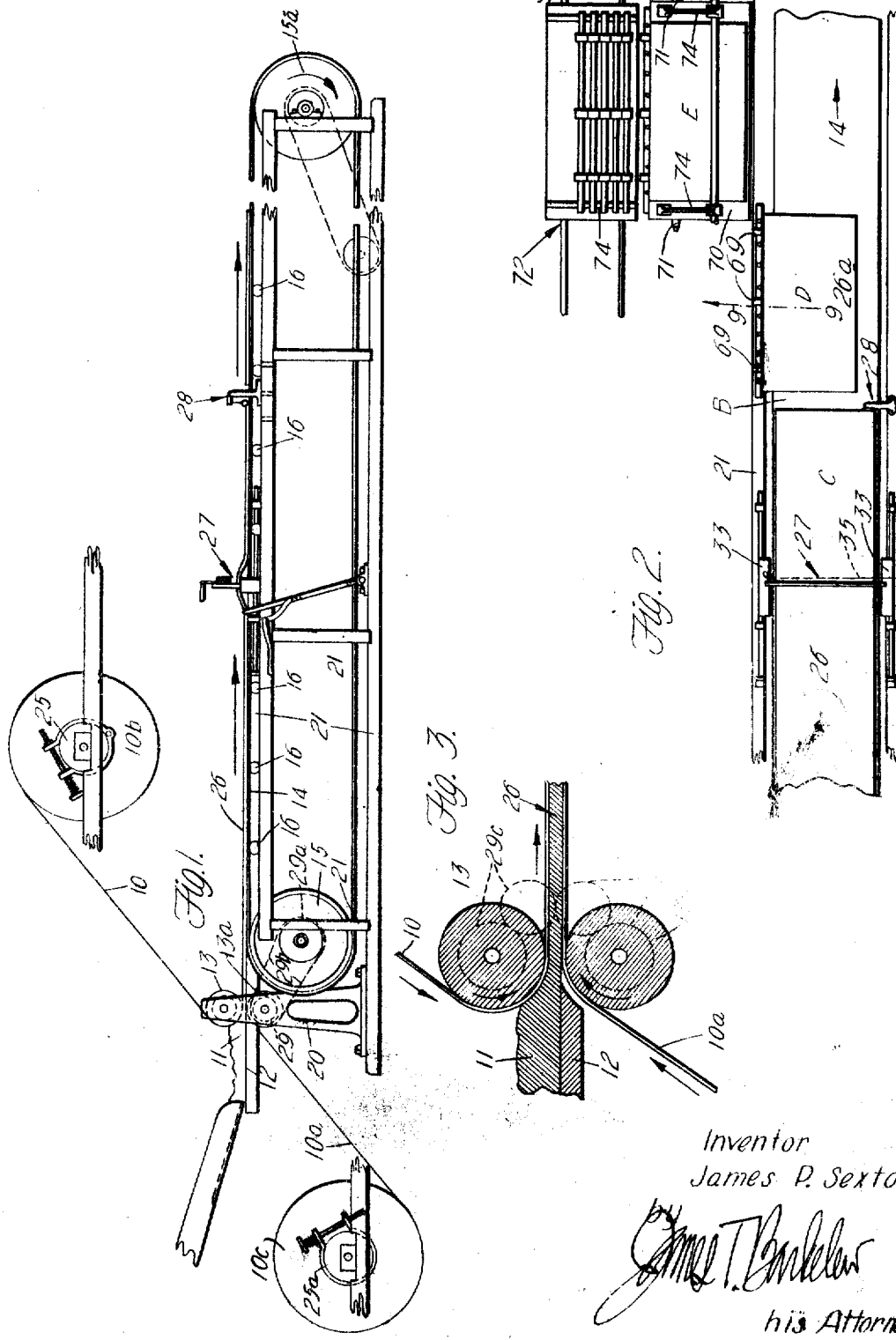

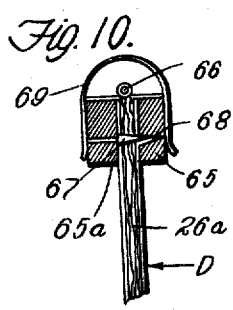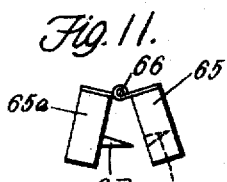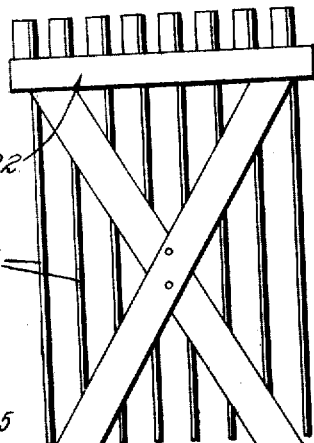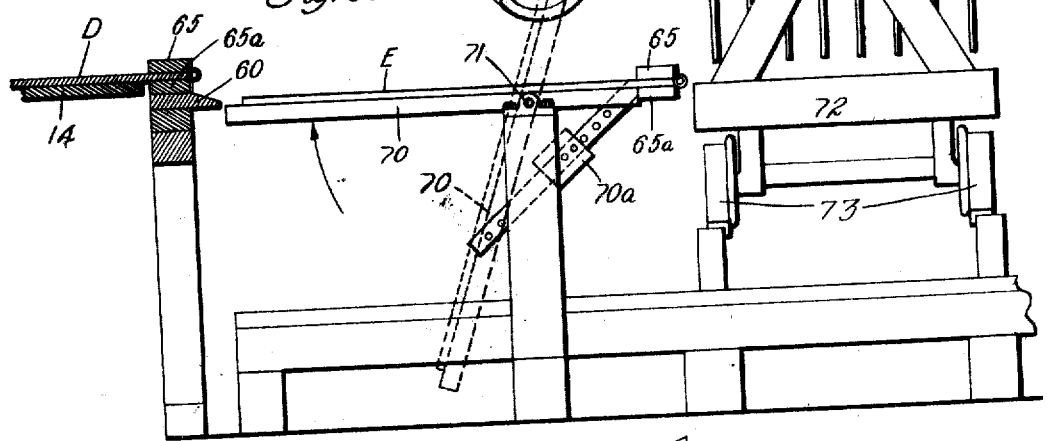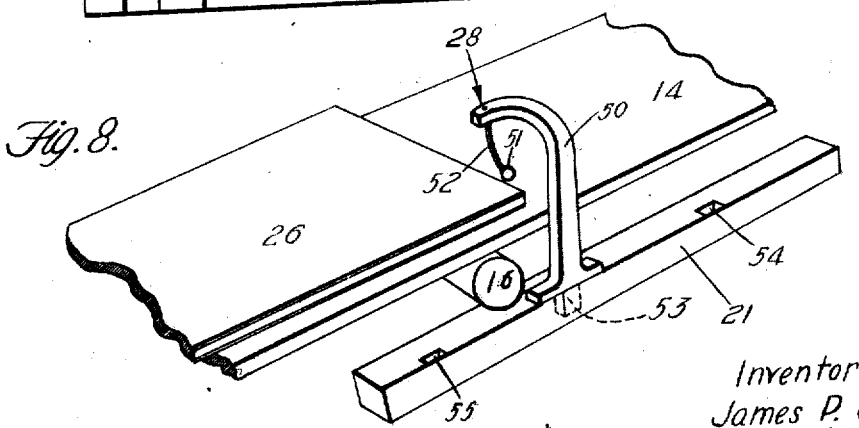

UNITED STATES PATENT OFFICE.

JAMES P. SEXTON, OF LOS ANGELES, CALIFORNIA.

MACHINE FOR MAKING AND CUTTING PLASTER-BOARD.

1,288,703.

Specification of Letters Patent.

Patented Dec. 24, 1918.

Application filed September 26, 1918. Serial No. 255,757.

*To all whom it may concern:*

Be it known that I, JAMES P. SEXTON, a citizen of the United States, residing at Los Angeles, in the county of Los Angeles, State of California, have invented new and useful Improvements in Machines for Making and Cutting Plaster-Board, of which the following is a specification.

This invention relates primarily to improved means of cutting to proper lengths materials in sheet form which are moving during the cutting action and which are usually carried on a conveyer of some kind. While my invention relates more particularly to the cutting of materials of manufacture involving thin sheets and interposed plastic materials such as paper and plaster, the former acting as containing means and the latter so compounded as to serve a variety of purposes useful in the constructive arts and building trades; I do not limit my purpose to the handling of any one class of material. In connection with the methods which I employ I find it convenient to use a traveling belt as a conveyer, and a further distinctive feature of its use lies in the fact that while it carries the materials to be cut, I have provided a means for feeding the material on the conveyer belt at a slower speed than the belt itself and maintaining this difference in rate of travel up to a position where the cutting takes place, after which the severed portion which rests upon the belt conveyer will travel at the belt's speed, thereby leaving behind the portion of the material from which it was severed and increasing its distance as much as desired, depending on the location of a delivery table on to which the severed portion is placed manually or by automatic means at the end of the belt. I employ adjustable rollers for determining the thickness of the finished sheet and a feeding platform for plastic material together with means of feeding the paper or other material from the web direct to the adjustable rollers. The conveyer belt may be driven in connection with, or separately as related to the feeding mechanism.

The distinctive feature which I employ is in connection with the cutting process and comprises means which permits of the cutting attachment traveling with the material to be cut and at the same speed thereof at the instant the cutting takes place; which may be either automatically or hand operated. I find it convenient to employ an indicating device for measuring purposes which may either inform the operator at which point to do the cutting or may start the operation of doing the work if automatic means are employed. The sheet after having been severed may have clamping pieces attached to a side edge thereof and removed sidewise from the belt conveyer to a table so pivoted or mounted as to be able to be tilted into a position suitable for the removal of the severed sheet from the table to racks conveniently located without causing change of shape of the sheet itself during this operation. The rack may contain any desired number of sheets and be located on a traveling truck or car which in turn may be removed to a drying kiln or any suitable place for further treatment.

Although my cutting mechanism is specifically useful in a situation such as here described, where the material does not travel at equal speed with the conveyer; yet that mechanism is not at all limited to such a situation. In fact, the cutter which I here explain as being attachable to the material may be used to sever lengths of sheet or other material which is not in motion, or in motion without the aid of a conveyer. This will all be apparent from the following detailed description of a preferred specific form of apparatus and mechanism embodying the invention.

Having now described in a general way the apparatus which I employ, reference may be had to the accompanying views. Figure 1 shows an elevation of the general arrangement: Fig. 2 shows a plan of a portion of same; Fig. 3 is an enlarged sectional detail showing the forming rolls, etc., at the head end of the conveyer belt; Fig. 4 shows a perspective view of the cutting mechanism; Fig. 5 is a fragmentary perspective showing the clamping bar in the position of being in contact with the sheet to be cut; Fig. 6 shows in perspective a section of the cutter clamping arrangement and illustrates the method of performing the cutting; Fig. 7 is an enlarged section showing in detail the parts shown in Fig. 6; Fig. 8 is a perspective showing an indicating device for measuring length of sheet to be cut; Fig. 9 is a partial cross section of the conveyer belt, the stationary frame in connection therewith and a sheet which has been cut which latter is ready for removing from belt conveyer, together with the tilting receiving table and receiving racks, being a view taken as indicated by line 9—9 on Fig. 2; and Figs. 10 and 11 are sections showing details of clamp employed to hold the severed sheets.

Referring first to Fig. 1, 10 and 10ª are webs of paper or other material in thin sheet form which act as surface sheets for the plastic material interposed between them, shown at 11 on the feeding table 12, which material is fed by hand or otherwise between adjustable feeding rolls 13 and 13ª and the surface sheets. A conveyer belt 14 traveling on drums 15 and 15ª, supported by numerous small rollers 16, acts as a carrier for the formed product which is rolled out into sheet form, as readily understood. It will be understood that rollers 13, 13ª are mounted in a suitable frame, shown at 20. There is also a structure suitable for mounting driving mechanisms and supporting rolls, shown at 21. Means for adjusting the tension of the webs is used, as shown at 25 and 25ª, which, in this case, is a friction band and drum applied to the shafts on which paper rolls 10ᵇ and 10ᶜ are mounted.

Fig. 3 shows in enlargement the process of feeding plastic material between the surface sheets which together form a product of manufacture herein termed the formed sheet 26. After leaving rollers 13 and 13ª, the latter of which is driven at a slower peripheral speed than the conveyer belt, the material passes to a cutting device 27 (Fig. 1). A sprocket wheel 29 is located on the shaft of roller 13ª (see Fig. 1). 29ª is a sprocket wheel located on the shaft of drum 15; 29ᵇ is a sprocket chain in contact with sprocket wheels 29 and 29ª for the purpose of transmission of the desired proportionate speed between the two. Gears 29ᶜ in combination with rollers 13, 13ª, enable the latter to revolve at equal speed; and in the present embodiment of my invention the peripheral speed of the rollers 13, 13ª is less than that of the belt 14. The frictional retardation at 25, 25ª is adjusted so that the paper webs, and therefore the formed sheet 26, travel with the rollers 13, 13ª and lag behind the belt 14. This lag may be varied by changing sprockets 29, 29ª. The belt 14 tends to constantly pull the formed sheet 26 ahead and keep it taut, flat and free from wrinkles.

The cutter mechanism is shown in Figs. 4-7. It is designed to be attached to the material (the sheet 26) during the cutting action; and this is done by clamping the cutter to the material. The sheet 26 to be cut while traveling on conveyer belt 14 may be clamped between the clamping plate 30 and the upper clamping bar 31 by movement of lever 32, which may be operated by handle 32ª, or by any suitable means as desired.

Fig. 5 shows the upper clamping bar 31 in its lower position after the movement of lever 32 has taken place, thus clamping the material to be cut between the lower clamping plate 30 and the upper clamping bar 31. It will be noted that lever 32 swings or turns about supporting pin 32ᵇ supported on pedestal 39 which rests on lower clamping plate 30. It will be noted that the clamping bar 31, when up and not in contact with the sheet, is maintained in position by virtue of the relationship of lever 32 and the pin 32ᵇ and 32ᶜ, there being sufficient spring or resiliency in the structure between supporting posts 39 and 39ª to maintain the bar 31 in the position shown, and to allow the lever 32 to be swung in the direction indicated to throw center 32ᶜ "over" center 32ᵇ when bar 31 is lowered. Thus in normal position the link 39ᵇ which is pivoted at 39ᶜ and pivotally supports the far end of bar 31, is held in straight alinement with bar 31; and link 39ᵇ will not begin to drop until the center 32ᶜ has passed below center 32ᵇ. But the links are of such length and are so pivoted that the whole lower edge of the bar 31 moves at all times parallel to itself and engages the surface of sheet 26 throughout its length at the same time, and so that subsequent pressure on handle 32ª will cause the bar 31 to press evenly on the sheet 26. It will be noted that the cutting mechanism in the position of Fig. 5 is clamped to and will travel with the material to be cut, which permits of the cutting operation to take place while the two are locked in a fixed relation to each other. Movement of the cutter is allowed by mounting the clamping members on sliding frames 33 and 33ª which slide in suitable bearing supports 34. After the operation of clamping, a cutting arrangement in the form of a wire or cord 35 shown fastened at 36 to frame 33ª, is caused to be tightened, and raised in a vertical direction by means of handle 37, or by any other means as desired; thus accomplishing the severing of the sheet 26 along the line of the forward edge of clamp bar 31. The relationship of the cutting wire to the clamping member 30 is shown clearly in Figs. 5, 6 and 7. The position of wire 35 during the act of severing is shown at Fig. 6.

The clamping plate 30 may be constructed or built up in any suitable manner. I find it convenient to make it of sheet metal bent to the form shown best in Fig. 7; having a flat smooth top portion 38 and a rounded back edge portion 38ᵈ, a drop off at 38ᵇ and a forward apron at 38ᶜ. The forward edge 38ª of this apron is the only part which may come into contact with the belt 14, although it is intended that this edge come close to but not contact with the belt. The roll at 38ᵈ strengthens the plate and makes a smooth rounded edge where the sheet 26 rises into the plate. The drop-off at 38ᵇ is preferably overhung, so that the wire 35 is amply protected from contact with sheet 26 when in its normal position as shown in Fig. 6. The apron 38ᶜ facilitates the return of the wire to its normal position and holds the wire out of contact with the moving belt 14. The whole sheet metal plate may, if desired, be reinforced by a bar 30ᵉ which extends across between frames 33 and 33ᵃ. This bar, and the frames 33 and 33ᵃ (or the frames and the sheet metal plate, if the bar 30ᵉ is not used) are rigidly connected together so as to form a unitary structure which extends squarely across the belt and slides longitudinally thereof.

Levers 40 and 40ᵃ are mounted on cross shaft 41 supported in bearings 42 and 42ᵃ, and they pass through or are otherwise attached to frames 33, 33ᵃ as shown at slots 43. They are for the purpose of returning the cutting and clamping mechanism to the normal position shown; stops 44 limiting the backward movement. Handle 45 is an attachment to lever 40 for the convenience of operating the latter if manipulated by hand. A loop for maintaining the cutting mechanism in place in the periods between cutting actions is shown at 46. The levers 40 and shaft 41 assist in keeping the frames 33, and therefore the clamping and cutting members, in proper transverse alinement across the material.

As heretofore explained, the formed product which is cut in sheets of suitable length at the position shown at 27 in Fig. 1, may have its length determined by a registering or indicating device 28, the function of which may be to act either as an indicator or as a means to manipulate an automatic performance to accomplish the purpose of severing the sheet. Such a device is shown in Fig. 1 and illustrated in Fig. 8 in which 50 is an arm carrying a member 51 which may be a weight suspended by strand 52 in such a manner as to be moved by the forward edge of the sheet 26. Arm 50 is shown inserted in a retaining aperture 53; 54 and 55 are similar openings for such different positions as may be necessited by the requirement for various lengths of sheet to be severed. After the process of severing has been completed it will be noted that the severed sheet will rest upon the traveling belt conveyer unrestrained and therefore travel with and at the same speed as the latter, thereby traveling away from the uncut portion of the sheet, immediately opening a space between the two as indicated at B in Fig. 2. That portion of the uncut sheet indicated by C is shown in a position ready to be cut. The sheet shown at D, having traveled away from sheet C as explained, is shown having been drawn manually or otherwise in the direction indicated by the arrow toward one side and over the edge of framework 21 and over a supporting shelf 60, which latter is shown in Fig. 9. (Or, in practice, the forming rolls, etc., may be so placed with relation to the belt that the formed sheet travels with its edge overhanging the belt edge; making it unnecessary to draw it to one side to reach position D). The sheet is then drawn laterally into position E after having traveled sufficiently in the direction of the belt to be in front of table 70. Figs. 10 and 11 show clamping members 65 and 65ᵃ suitably hinged at 66, said clamping members containing a plurality of fastening pins 67 which pass through sheet D and project into openings 68, thus clamping and holding the edge of the severed sheet D. Fastening clamps 69 are used to hold the clamping members in place. After sheet D has been removed from conveyer belt 14 to position E onto a tilting table 70, this table is then swung about the axis 71 into a vertical or nearly vertical position, as shown in dotted lines in Fig. 9. The sheet is then hung by being transferred from table 70 to supporting racks 72 on trucks 73. The clamps 65, 65ᵃ are longer than the severed sheets and the ends of the clamps are hung on the racks 72 so that the sheets shown at F then are suspended. Table 70 may have an adjustable counterweight 70ᵃ which will move or assist to move the table back to its horizontal position after the sheet E is removed; and the weight of sheet E will move or assist to move the table to its tilted position; the pivot 71 being set nearer one edge of the table than the other. Transfer to the racks 72 may be accomplished manually or by a suitable mechanism. Such a mechanism may embody a pair of swinging arms 74 which move the suspended sheets up to the level of the racks 72.

From the foregoing description the operation of the apparatus herein described may be readily understood. The plaster board or the like is formed between the rolls 13, 13ᵃ, passes onto the belt 14 and passes down along through the cutter mechanism, and then the severed lengths pass on at the speed of the belt and the clamp 65, 65ᵃ is attached to the side edge of the severed sheet. The body of the severed sheet still rests upon the belt while the clamps rest upon the shelf 60. The severed clamped sheet then travels on with the belt until it comes opposite the table 70 which is then in a horizontal position; when the operators grasp the opposite ends of the clamp and move the clamp and the severed sheet to the position shown at E, the clamp overhanging the edge of the table, so that when the table is tipped to its vertical position the clamp holds the severed sheet from slipping down the table. The operators then grasp (or arms 74 engage under) the ends of the clamp and lift the severed sheet and place it upon the truck 72. Truck 72 is then moved off and the sheet is allowed to set and is dried while in suspended position. The fact that the belt moves at higher speed than the formed sheet of plaster board causes a sufficient space to be developed between the severed piece D and the oncoming end C to allow sufficient time for the transverse movement and clamping of the severed piece without interference with the oncoming unsevered piece.

Now, although it will be readily seen that my cutter mechanism is of particular utility in combination with a mechanism where the material to be cut is traveling at a speed different from that of the conveyer, its use is not at all limited to such a specific situation, but can be used in any situation where it is desirable to secure a clean accurate cut on material whether that material is moving on a conveyer, or moving by itself, or is stationary. The typical application of my cutter mechanism is on or with a moving sheet of material; and in the art of manufacturing plaster board and the like the cutter will usually be applied to a sheet of material moving on a conveyer, such as described. In such a situation the operation of the cutter mechanism is readily understood from the foregoing description. The operator watches the indicator 28 and when the indicator is moved by the forward end of the advancing material, the operator then throws handle 32ª over and downwardly in the direction indicated by the arrow in Fig. 4, thus bringing the upper clamping bar 31 down on the material and clamping the material between the clamping bars 30 and 31. The whole cutter mechanism then begins to move with the material. The operator then stretches the wire or string 35 taut and then pulls upwardly on one end of it, drawing the wire or string up through the material and thus effecting a severance of the material at the edge of bar 31. The edge of bar 31 is preferably directly above the "drop-off" 38ᵇ before referred to; so that the wire or string 35 which normally rests against this "drop-off" will be pulled directly upwardly in line with the edge surface of upper bar 31. And the lower edge of bar 31 is preferably narrow and somewhat rounded so as to present no sharp corners to the sheet 26. The alinement of bar 31 with the forward edge of overhanging drop-off 38ᵇ enables the wire 35 to make a clean square cut. As soon as the sheet has been severed, then the wire 35 is put right back into its normal position. This may be done by passing the wire right back through the cut just made; or, in the specific form of mechanism here described, where the cut sheet immediately begins to move away from the part following, the wire is easily returned through the intervening space, which immediately begins to widen out. The wire having been put back in proper position, the clamp bar 31 is again moved up to its normal position, releasing the cutter mechanism from the material. The cutter mechanism may then be moved back to its normal position, the bar 30 being moved back under the material sheet 26 which is constantly moving forward. When the cutter mechanism is in its normal position, the loop 46 may be used to hold it in that position; but in actual practice the operator usually stands against the handle 45, leaning against that handle to hold the mechanism back in position, and relieving his weight off the handle as soon as he has moved the clamping bar 31 down and wishes the cutter mechanism to move with the material.

Having described a preferred form of my invention, I claim:

1. A cutter mechanism adapted to be attached to materials during cutting action thereon, said mechanism embodying a material clamp, and a cutter carried by said clamp.

2. A cutter mechanism adapted to be attached to materials during cutting action thereon, said cutter mechanism embodying a material clamp, and a cutter carried by and coöperating with the clamp for cutting the clamped material.

3. A cutter mechanism adapted to be attached to materials during cutting action thereon, said cutter mechanism embodying a material clamp, and a cutter embodying a flexible cutting member secured relatively to the clamp at one end and free at the other end.

4. A cutter mechanism adapted to be attached to materials during cutting action thereon, said cutting mechanism embodying a clamp comprising a pair of elongated clamping bars, and a cutter embodying a flexible cutting element secured at one end to the end of the clamp and having its other end free and adapted to be pulled taut and raised to cut the clamped material along the edge of one of the clamping bars.

5. In a cutting mechanism of the character described, a movable frame, a relatively stationary and a relatively movable clamping bar mounted on the frame and adapted to clamp material between them, and a cutter element affixed to the frame and adapted to cut materials clamped by the bars.

6. In combination with a material moving means, a movable cutting mechanism mounted to be movable in the direction of movement of the material, a means for attaching the movable cutting mechanism to the material to move therewith during cutting action, and a cutting element associated with the attaching means.

7. In combination with a material moving means, a cutter mechanism adapted to move with the material, said cutter mechanism embodying a frame mounted to move in the direction of movement of the material, said frame having a lower clamping plate over which the material moves, an upper clamping plate and means for clamping the upper clamping plate down on the material over the lower clamping plate, and a cutting element associated with the frame.

8. In combination with a material moving means, a cutter mechanism adapted to move with the material, said cutter mechanism embodying a frame mounted to move in the direction of movement of the material, said frame having a lower clamping plate over which the material moves, an upper clamping plate and means for clamping the upper clamping plate down on the material over the lower clamping plate, and a cutting element associated with the frame and adapted to cut the material along one edge of the upper clamping plate.

9. In combination with a conveyer adapted to convey material desired to be cut into lengths, a movable cutter mechanism embodying a frame movable in the direction of movement of the material, a lower clamping plate extending over the conveyer and between it and the material, an upper clamping bar adapted to be moved down onto the material, and a cutting element associated with the movable frame.

10. In combination with a conveyer adapted to convey material desired to be cut into lengths, a movable cutter mechanism embodying a frame movable in the direction of movement of the material, a lower clamping plate extending over the conveyer and between it and the material, an upper clamping bar adapted to be moved down onto the material, and a cutting element associated with the movable frame and adapted to cut the material by upward movement away from the conveyer.

11. In combination with a conveyer adapted to convey material desired to be cut into lengths, a movable cutting mechanism having a plate which extends across the conveyer under the material, means for clamping the material against said plate, and means in association with said plate and said clamping means for cutting the material.

12. In combination with a conveyer carrying material desired to be cut into lengths, a movable cutter mechanism embodying a plate extending across the conveyer between it and the material, means to clamp the material down onto said plate, and means normally lying under the material along the plate and adapted to cut the material by movement away from the conveyer.

13. In combination with a conveyer adapted to convey material desired to be cut into lengths, a movable cutting mechanism having a plate which extends across the conveyer under the material, means for clamping the material against said plate, and means in association with said plate and said clamping means for cutting the material, said plate being provided on its lower edge with a drop-off and with an apron below the drop-off, and said cutting means embodying a flexible cutting element lying normally on said apron below said drop-off and attached at one end to the plate and having its other end free to be pulled taut and moved upwardly to cut upwardly through the material when clamped against the plate.

14. In combination with a conveyer adapted to convey material desired to be severed into lengths, means for retarding the movement of the material so that the material lags behind the conveyer movement, a movable cutting mechanism, and means for attaching the cutting mechanism to the material during cutting action.

15. In combination with a conveyer adapted to convey material desired to be severed into lengths, means for retarding the movement of the material so that the material lags behind the conveyer movement, a movable cutting mechanism, and means for attaching the cutting mechanism to the material during cutting action, the cutting mechanism being substantially out of contact with the conveyer.

16. In mechanism of the character described, a cutter mechanism adapted to act on moving material embodying a cutter, a clamp adapted to attach the cutter to the material, and mounting means for the cutter mechanism allowing it to move with the material and holding it in transverse alinement across the moving material.

In witness that I claim the foregoing I have hereunto subscribed my name this 3d day of September 1918.

JAMES P. SEXTON.